July 13, 1971 T. L. SHEPHERD 3,592,623

GLASS MELTING FURNACE AND METHOD OF OPERATING IT

Filed April 4, 1969

INVENTOR
THOMAS L. SHEPHERD
BY
F. B. Henry
ATTORNEY

United States Patent Office 3,592,623
Patented July 13, 1971

3,592,623
GLASS MELTING FURNACE AND METHOD OF OPERATING IT
Thomas L. Shepherd, Essex Fells, N.J., assignor to Air Reduction Company, Incorporated, New York, N.Y.
Continuation-in-part of application Ser. No. 734,611, June 15, 1968. This application Apr. 4, 1969, Ser. No. 813,505
Int. Cl. C03b 5/04
U.S. Cl. 65—135                    26 Claims

ABSTRACT OF THE DISCLOSURE

This invention relates to a method and apparatus for increasing the melting rate in a glass tank utilizing oxy-fuel combustion techniques. More particularly, an oxy-fuel flame is directed toward the feed end of a glass tank so as to control the location and melting of the raw glass batch materials that are added to the melting zone.

---

This application is a continuation-in-part of application Ser. No. 734,611 filed on June 15, 1968 entitled "Oxy-fuel Accelerated Glass Melting," inventor, Thomas L. Shepherd.

The aforementioned parent application discloses methods and apparatus for raising the temperature of the glass in a glass fining furnace without producing a corresponding increase in the temperature of the crown of the furnace. An improved result is obtained by using at least one oxy-fuel burner flame projected in the direction of the length of the furnace and from a level above the glass and downward at an angle which permits the combustion of the flame to be substantially complete before the products of combustion from the flame brush the top surface of the molten glass. This aforementioned technique has been highly successful in accelerating glass melting while retaining the desired glass characteristics.

Continuing work in the glass melting field has resulted in the present invention which will now be briefly summarized. In the typical glass melting furnace or glass tank as the term is known in the art, the raw glass making materials are charged into the melting zone of the furnace. Glass tanks are operated continuously and therefore there is an existing bath of molten glass in the melting zone into which the raw material is placed. The raw batch may be charged into the tank by any of the well known mechanical charging devices. The glass tank usually consists of the melting zone and the fining zone. The glass product is withdrawn from the fining zone. Batch materials are usually added when the depth of the molten glass bath drops to a certain level. When this occurs, automatic sensing means senses the low level of the bath and actuates the feeder mechanism which introduces raw glass batch into the melting zone. Heretofore there has been no method to control the location of the raw batch materials which have been introduced into the melting zone. In practice the batch materials would lie on the surface of the molten bath and due to the fact that the molten bath was generally moving toward the fining zone where it was ultimately discharged, the batch materials would float on the surface of the bath in the melting zone and move toward the discharge end of the tank. Furthermore this movement caused the surface of the molten bath to be at least partially covered throughout its length with raw batch material. This layer adversely affects the heat transfer characteristics between the glass bath and the high temperature atmosphere above the bath.

In order to solve the problems mentioned above with regard to the movement of the glass batch toward the fining end, applicant devised the methods and apparatus which are the subject of the instant application. In summary, I conceived of the concept of placing a high temperature, high velocity oxy-fuel burner in the portion of the melting zone remote from the infeed end. The oxy-fuel burner was placed so that the oxy-fuel flame and the products of combustion therefrom were directed toward the infeed end. More particularly, the oxy-fuel burner was placed relatively close to the molten bath and was directed downwarly at a slight angle so that the products of combustion of the high temperature flame would traverse a substantial length of the molten bath. The burner was so aligned that the products of combustion therefrom which move at a relatively high rate were caused to impinge upon the unmelted raw batch materials so that the raw batch materials were maintained at the infeed end. By thus retaining the unmelted materials on the surface in the infeed end and by the added heat transferred from the products of combustion to the glass, the melting rate of the furnace was substantially increased and the purity of the product therefrom was substantially improved.

It is therefore an object of the present invention to alleviate the defects noted above in connection with the prior art methods of glass making.

Another object is to provide apparatus for controlling the position of the unmelted batch material in a glass tank.

Still another object is to provide a process and apparatus for producing improved quality glass at an increased production rate in existing glass tanks.

Still another object is to provide methods and apparatus for accelerating the melting of raw glass batch materials in a glass tank.

Another object of the present invention is to utilize a nonluminous oxy-fuel flame or flames in conjunction with air fuel flames in a glass tank to produce an increased melting rate in the glass tank.

A still further object is to provide methods and apparatus for increasing the melting rate of glass materials while reducing the costs connected therewith.

Another object of the invention is to cause local recirculation of unmelted batch material at the feed end of the melting zone of a glass tank, thereby preventing the movement of the raw batch material toward the fining end. Other objects, features and advantages of the invention will appear or be pointed out as the description proceeds.

Some embodiments of the invention are illustrated in the accompanying drawings, not drawn to scale, in which.

Figure 1:
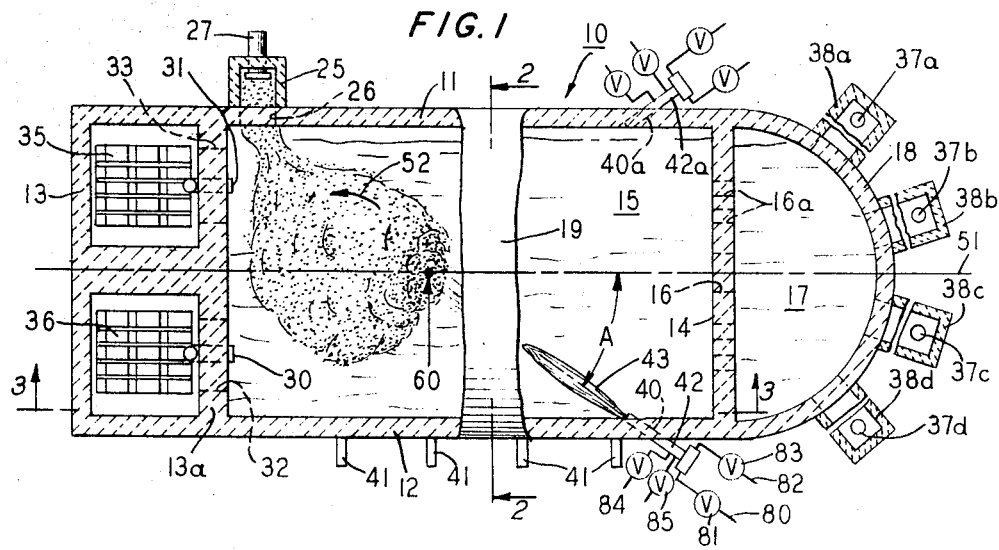
FIG. 1 is a schematic plan view, partly in section and partly broken away, of a glass melting furnace embodying an oxy-fuel burner positioned in accordance with the present invention.

In FIG. 1 there is illustrated schematically a plan view of an elongated regenerative glass tank of conventional construction. The tank is formed in part by side walls 11, 12, 18, end wall 13, back wall 13a, a bridge wall 14 and roof and bottom structure. The bridge wall 14 contains a port or throat 16 located below the surface of the glass which permits the molten glass to enter into the fining zone 17. The wall also contains ports 16a above the molten surface to allow hot gases to enter the fining zone. The fining zone is contained in what is referred to as the nose section of the glass tank. The fining section is defined in this embodiment by the bridge wall 14, an annular wall 18, a roof portion and a bottom portion. The melting zone 15 is defined by side walls 11 and 12, back wall 13a, and bridge wall 14, roof and bottom structure.

Figure 2:
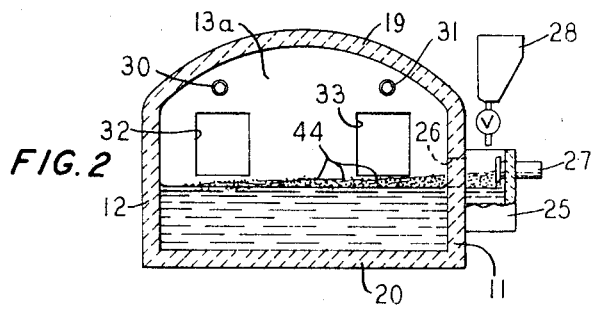
FIG. 2 is a schematic elevational view, partly in section, partly broken away, taken along line 2—2 of FIG. 1.

FIG. 2 illustrates in cross section the roof 19 and the bottom 20 of the furnace. In most glass tanks the roof is arched.

The details of the walls, roof structure, and bottom portion of the glass tank are not described in detail in that the construction of these well known elements forms no part of the present invention. Due to the high temperatures involved in the melting and refining of glass, suitable refractory material must be installed in the interior portions of the walls, roof, and bottom of the glass tank.

In the embodiment shown in FIG. 1 a structure, commonly referred to as the dog house 25 is mounted on the outside of side wall 11 near the back wall 13. The term dog house is used to refer to a walled structure through which the raw glass batch materials are introduced into the glass tank. The dog house 25 communicates via a port 26 through the side wall 11 with the melting zone 15. Any suitable conveyor means or loading device such as a hopper 28 may be used to deposit the raw batch materials into the dog house 25. The raw materials are dropped on top of the molten bath which is in the bottom portion of the dog house and the raw materials are then pushed into the interior of the glass tank by means of a reciprocating device, such as ram 27. Any other suitable device may be utilized to push the raw materials into the interior of the melting zone 15. The raw materials usually consist of sand, limestone, soda ash, etc. The batch make up depends on the type of glass being made.

Due to the fact that the raw materials are lighter than the molten materials within the tank, the raw materials float on the top of the bath and are normally carried by the bath toward the bridge wall 14. It is the intention of the present invention to prevent the flow of the raw materials toward the bridge wall and the specific manner in which this is accomplished will be discussed in greater detail below.

In the conventional glass tank, such as shown in FIGS. 1 and 2 the heat necessary for melting the raw materials and for maintaining the molten bath at a desired temperature is provided in part by a pair of burners which are indicated by the reference numerals 30 and 31. The detailed structure of the burners is not illustrated in view of the fact that it forms no part of the present invention. The burners are designed to burn a suitable liquid fuel such as oil, or a fuel gas such as natural gas. The type of fuel used depends on what is available commercially, the economy of the fuel, and its suitability for glass melting. The burners are positioned in the back wall 13a directly over the ports 32 and 33. The ports communicate with conventional checker structures 35 and 36 which serve to alternately conserve and capture a portion of the heat energy released in the glass tank and to preheat air before it proceeds to the burners. Burners 30 and 31 operate alternately; that is, while one burner is in operation the other burner is in stand-by. For example, if burner 30 is in operation it will utilize the air from checker 36. The burner usually takes the form of a pipe like structure through which a fuel, such as natural gas, is forced. The air fuel burner 30 will project a bushy flame substantially horizontally into the interior of the glass tank and the hot effluent will flow in a counter clockwise pattern and pass out through port 23 and then through checker 35 to heat the same. After a certain period of time or perhaps dependent upon the checker temperature, burner 30 will be shut down and burner 31 will be fired. The burner 31 will produce a bushy flame and create a circulation in the melting zone which will move in a clockwise pattern, escaping through port 32 and then through checker 36 to heat the same. In this manner the checkers 35 and 36 are used to preheat the air which then is utilized in the air fuel burners. Suitable blowers are utilized with the checker works 35 and 36 to force air through one checker work to the air fuel burner which is fired and to pull a suction on the other check work so that an efficient heat exchange is made. The conventional blowers are not illustrated due to the fact that they are well known to persons skilled in this particular art.

In the conventional glass tank there is no oxy-fuel burner associated with the melting operation and therefore the total heat input is obtained from the air fuel burners, the preheated air and, in some cases by electrical resistance heating. Electrodes 41 extend into the molten bath through the sides or the bottoms of the tank and are connected to a power source. Electrical current is caused to flow between the adjacent electrodes thereby heating the glass bath resistively. Resistive heating at constant voltage is directly proportional to temperature and by raising the temperaure of the glass bath, the transfer rate of heat to the bath is increased and therefore production is increased. Heretofore there has been no successful approach to increasing this temperature. As mentioned above, in the conventional glass tank there is no method or apparatus for controlling the movement of the unmelted batch toward the bridge wall 14. Therefore, the unmelted material will float on the surface and will in some instances actually come in contact with the bridge wall 14. If this happens it is probable that some of the unmelted batch material will pass through throat 16 and enter the fining zone 17. The glass which is obtained from orifices 37a–d in the forehearths 38a–d will therefore be non-uniform and will contain impurities. It is known that the raw batch material contains occluded gas and this gas is distributed throughout the portion of the molten bath by the raw material as it melts. Thus if any raw materials proceed to the area of the port 16 or into the fining zone 17, undesirable gas bubbles will be distributed in the molten bath. As stated above it is an object of the present invention to effectively control the movement of the raw materials toward the fining zone 17.

This problem has been recognized for some time in the glass melting field and a number of patents have specifically described this problem and offered solutions. For example, U.S. Pat. No. 3,265,485 issued on Aug. 9, 1966, is directed to this same problem. The patent proposes a solution to the problem and this solution involves the insertion of a plurality of cooling pipes into the molten bath in such a manner that they will screen out the unmelted materials and also cool a portion of the molten bath, thereby setting up thermal currents in the bath which will keep the unmelted material in the inlet end of the glass tank. By introducing a cooling medium into the molten bath in such a manner that they will screen out the unmelted materials and also cool a portion of the molten bath the temperature of the bath is reduced and therefore large quantities of the heat input which go into heating and maintaining the temperature of the bath are being wasted. Furthermore, the plurality of cooling conduits which are inserted into the bath do not effectively screen out the raw materials which float on the surface of the bath. Particles and agglomerates smaller than the space between the cooling elements pass freely between the elements and proceed onward toward the fining zone. The cooling elements constitute a huge heat sink into which valuable heat is lost. The thermal currents which are induced by the cooling elements have been found insufficient to contain the raw batch material in the entrance end. The thermal currents centered around the "hotspot," as described in the subject patent, are well known and it is the applicant's intention to provide a means supplemental to the thermal currents to assist in the melting of the raw material at the entrance end.

In the parent application there is made mention of U.S. Pat. No. 3,337,324, issued on Aug. 22, 1967. In this patent there is a teaching of directing an oxy-fuel flame directly downward onto the raw glass batch in the feed end of the furnace. As stated in the parent application it has been found that this often causes burning of the surface of the batch and can further cause small particles of the batch to enter the atmosphere of the furnace and adhere to the refractory lining of the glass tank. There is no indication in the Cable Jr. et al. patent that the patentee controls the position of the unmelted batch by utilizing the effluent from the oxy-fuel flame. The fact that he directs his oxy-fuel flame substantially vertically downward onto the glass batch to peel back the same and cause it to go in all directions, indicates that he is not interested in positioning the unmelted material or in maintaining it at a specified location.

As indicated in the parent application, I have successfully utilized an oxy-fuel burner in a unique manner in the glass tank so as to increase the melting rate thereof. In the present invention I utilize the same concept but in addition I also utilize the effluent from the oxy-fuel flame to position the raw material at the infeed end of the glass tank.

In a glass tank construction in accordance with the showing in FIG. 1 a port 40 was cut through side wall 12 in order that an oxy-fuel burner 42 could be inserted through the side wall to direct an oxy-fuel flame into the portion of the melting zone above the molten bath. The oxy-fuel burner 42 was of the type illustrated in FIG. 3 of the aforementioned parent application and in U.S. Pat. No. 3,092,016. In the embodiment shown in FIG. 1 an oxy-fuel burner having a nominal 1½ inch diameter was utilized. The burner used natural gas and commercially pure oxygen in the manner taught in the parent application and was capable of introducing between 1 and 5 million B.t.u.'s per hour into the glass tank during normal operation. The normal desired flame temperature range for this type of burner is 4000° to 5000° F., with the preferrd range being 4600°–5000° F. The flame velocity range is 2000 to 3500 feet per second, with the preferred range being 3000–3500 feet per second. Both the flame temperature and the flame velocity are dependent upon the type of fuel being burned, the purity of the oxygen supplied to the burner, and the pressures and rates at which both the oxygen and the fuel are supplied to the burner.

The natural gas was supplied to burner 42 through a conduit 80 controlled by a suitable valve 81. The oxygen was supplied through a conduit 82 controlled by a valve 83. The oxygen came from a customer station where it was stored in liquid form and then vaporized and supplied to the burner. Cooling water for the burner was supplied through supply conduit 84 and exhausted through conduit 85. As mentioned in the parent application, the burner design provides for an intimate mixing of the fuel and oxygen, and results in an anchored, stable, non-luminous, high velocity and high temperature flame. The non-luminous characteristic of the flame is most important in that this minimizes radiant heat transfer from the flame to the refractories. Various types of fuel gases may be used and oxygen of a lesser purity than a commercial grade may also be used. As described in the parent application, sufficient oxygen must be supplied to completely burn the fuel and produce a non-luminous flame. The stoichiometric ratio may range from 100 to 150 percent.

Figure 3:
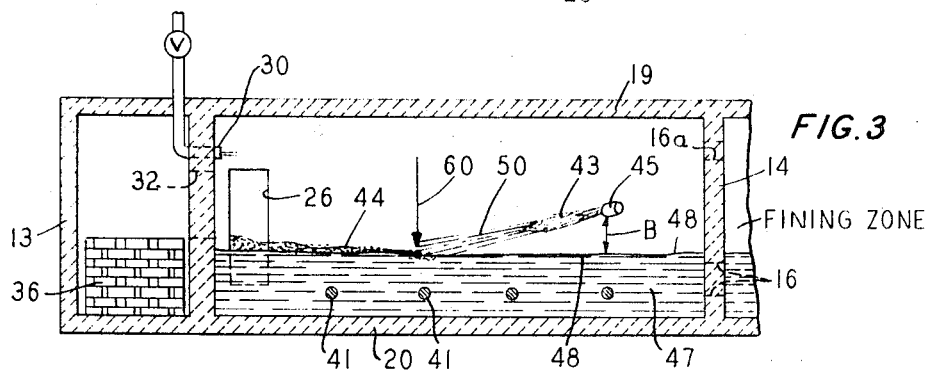
FIG. 3 is a view partly in section, partly broken away, taken along line 3—3 of FIG. 1.

The internal dimensions of the melting zone 15 in the embodiment shown in FIG. 1 were 16 feet by 26½ feet. The oxy-fuel flame 43 which emanated from the tip of the burner 42 was approximately 6 feet in length and therefore traversed a considerable distance through the melting zone 15. FIG. 3 illustrates the burner tip 45 which is mounted substantially flush with the side wall 12 and the oxy-fuel flame 43 which emanates therefrom. The tip of the burner 42 was approximately 2 feet above the metal line, which is a term used in the art to refer to the molten surface of the bath and approximately 3 feet from the bridge wall. The burner was inclined downwardly toward the infeed end so that both the oxy-fuel flame and the products of combustion therefrom would be at all times in close proximity to the molten bath. The angle of inclination, however, was not so great as to bring the actual oxy-fuel flame into contact with the molten bath. The reasons for avoiding this are clearly set forth in the parent application. It is an intention of the invention, however, to have the products of combustion, which emanate from the oxy-fuel flame, contact the molten bath and the raw glass batch material which lies on the surface thereof. This is clearly illustrated in FIG. 3. The raw glass batch material 44 which comes into the melting zone through port 26 floats on the surface of the molten bath 47. The metal line is indicated by the reference number 48. The products of combustion 50 which emanate from the high velocity oxy-fuel flame 43 are directed so as to contact the raw material 44 and force it toward the back wall 13a. The flame velocity length and temperature are adjusted so that the glaze on the floating batch is not peeled but so that there is sufficient momentum exchange to control the movement of the raw glass batch material on the surface. By adjusting the firing rate of the oxy-fuel burner the unmelted batch can be maintained in the infeed end and it can even be caused to recirculate in whirlpool fashion in a counter clockwise direction as indicated by arrows 52, if desired. The unmelted material remains in the infeed end of the melting zone 15 until the raw material melts and becomes a part of the molten bath 47. While this recirculation continues additional raw material is of course being fed into the doghouse 25 and is continually passing through port 26 into the melting zone. The new raw material joins the already existing whirlpool and therefore remains in the infeed end of the melting zone. By forcing the unmelted material to melt at the infeed end and become a part of the bath, the gases which are part of the unmelted material are released in the molten bath at the infeed end. Thus, as the molten bath moves toward the throat 16 from the infeed end it will be of a much more uniform and pure consistency due to the fact that the occluded gases have been substantially already removed in the infeed end. Some small gas bubbles are encountered in the molten bath as it passes the electrode 41. However, the bubble number is considerably reduced and the bubbles are more freely able to escape from the bath due to the fact that the raw glass material is not covering the surface of the bath in the area below the infeed end.

It is well known that in glass tanks of the configuration illustrated in FIGS. 1–3, thermal currents are generated in the molten bath. The currents are caused by different temperatures in the different regions of the tank. For example, each tank has a "hot spot" where the glass is at its highest temperature. The hot spot takes the form of a spring due to the fact that the relatively hot liquid is lighter than the surrounding colder liquid and therefore wells up to the surface of the bath in the manner of a spring. This spring necessarily causes movement of the liquid which is welled up away from the hot spot. The location of the hot spot in FIG. 1 is indicated by the reference numeral 60. As indicated in Pat. No. 3,265,485 there is a tendency for a portion of the molten material emanating from the hot spot to flow toward the back wall 13a. This thermal current is, however, insufficient to maintain the unmelted batch material at the entrance end. By aiming the oxy-fuel burner in the manner above described and by impinging the products of combustion of the oxy-fuel flame on the raw material on the surface, the thermal current which was just mentioned, is aided in moving the unmelted material toward the entrance end. In the preferred form of the invention, the products of combustion indicated by the number 50 come into contact with the molten bath and the unmelted material at approximately the location of the hot spot 60 or upstream thereof. The products of combustion have a higher temperature (3000°–4000° F. and preferably 3500°–4000° F.) than the molten bath and are trained upon the hot spot to raise the temperature of the hot spot and of the molten bath in general by essentially convective heat transfer. In general, the bath temperatures in the melting zone range from about 2600° to 2800° F. for the production of conventional bottle glass. Thus by increasing the temperature in the area of the hot spot the flow of the aforementioned thermal current is increased. At the same time there is a momentum exchange between the raw batch on the surface and the combustion products causing the raw batch to move toward the back wall, as described above.

Thus, by utilizing the present invention, the unmelted glass batch will be kept at the infeed end of the melting zone and upstream of the hot spot until the raw material becomes molten and a part of the molten bath 47. In the preferred form of the invention the oxy-fuel flame should be kept as close to the bath as possible without actually contacting it. Therefore in the preferred form, the oxy-fuel burner tip should be positioned in the glass tank so that it is not less than about one foot above the molten surface and not more than about four feet from the molten bath surface. Oxy-fuel burners can if necessary be positioned up to about eight feet from the molten surface, however, a distance of from one to four feet is preferred. The oxy-fuel flame may range in length from about 2 feet to about 10 feet depending upon the type of burner utilized and upon the inputs to the burners and its construction. As mentioned above, it is important that the oxy-fuel flame does not contact the molten material or the unmelted batch material and therefore the tip of the oxy-fuel flame or the terminus of the combustion zone of the flame jet, as it is referred to in the parent application, should terminate no less than about 2 feet nor more than about 10 feet from the general location of the hot spot. This distance is measured along the longitudinal axis of the burner. The products of combustion which emanate from the oxy-fuel flame traverse this distance and strike the hot spot and the unmelted batch material on the surface of the bath. The aforementioned rocket burners are unique in that their flame patterns are highly predictable, of great velocity and temperature, and are stable in character. The air fuel flames which emanate from the burners 30, 31 on the other hand, are extremely bushy and cannot in any sense be said to be stiff. The oxy-fuel flame is a stiff flame and as discussed above can be trained upon a particular area which is to be heated or treated. The oxy-fuel flame is projected into the furnace at a lower level than the air fuel flames.

In a glass tank comparable to that illustrated in FIGS. 1–3, the hot spot temperature before the oxy-fuel burner was installed was normally 2740° F. After the installation and operation of the oxy-fuel burner in the manner above described, the hot spot temperature increased to 2800° F. In the tests the muzzle or tip of the oxy-fuel burner 42 was located approximately 3 feet from the bridge wall 14 and approximately 22 inches (B) above the molten bath surface. The burner was angled (A) approximately 35° to the longitudinal axis of the glass tank and was angled downwardly toward the molten bath surface approximately 7⅓°. The distance from the muzzle or tip of the oxy-fuel burner to the bath surface along the axis of the burner was approximately 14 feet. In the tests that were run the burner was ignited at 2:15 p.m. at a firing rate of 2000 s.c.f.h. of natural gas and 4000 s.c.f.h. of oxygen. The air fuel firing rate was reduced at the same time from 30,500 s.c.f.h. natural gas and 375,000 s.c.f.h. air to 28,500 s.c.f.h. natural gas and 355,000 s.c.f.h. air. The first effect noticed was an immediate increase in the checker temperature to 2720° F. in checker 35. Due to a weak spot and patch in the cap of the checker chamber, this temperature created some concern. However, the condition was corrected by reversing when the temperature reached about 2680° F. A reversal cycle was then employed to correct the excessive checker temperature condition. The pull on the tank at this time was 134.38 tons per day. These conditions were maintained for approximately two days when the pull on the tank was increased to 136.36 tons per day. All energy for the increased heat requirement was then added through the oxy-fuel burner. Accordingly, at 9:40 a.m. the firing rate of the oxy-fuel burner 42 was increased to 2250 s.c.f.h. natural gas and 4500 s.c.f.h. oxygen. These conditions were maintained until 10 a.m. the following day when the pull on the tank was increased to 143.3 tons per day. At this time, the firing rate of the oxy-fuel burner was increased to 2500 s.c.f.h. natural gas and 5000 s.c.f.h. oxygen flow to provide the required increased thermal energy needed for melting the extra tonnage. The pull was maintained at 143.3 tons per day at the same firing rate until 8 a.m. the following day when a change in the production schedule necessitated a reduction to 136.7 tons per day. At this time, the firing rate for the oxy-fuel burner was reduced to 2000 s.c.f.h. natural gas and 4000 s.c.f.h. oxygen. It is of interest that, during the period of heavy pull, the glass was increasing in temperature. The previous absolute maximum the tank had produced was 138 tons per day with maximum conventional firing and with the electrical boost system set at maximum. During the period of oxy-fuel firing and 143.3 tons per day production, it was necessary to continually reduce electrical boost settings to maintain constant boost current. The glass quality was judged to be good during this period.

The 136.7 ton per day production rate at reduced oxy-fuel firing rate was maintained and good quality glass produced until 8:20 p.m. when the main transformer supplying electrical power to the entire plant failed, automatically shutting off the oxy-fuel system as well as the lights and all electrical power equipment in the plant. This failure had nothing to do with the present invention, but caused a termination of the test.

The increase in the bath temperature has another effect in that it materially increases the amount of electrical energy which may be introduced into the furnace through the electrodes 41. The rate at which the molten bath can be heated by resistance heating at constant voltage is directly dependent upon the temperature of the bath. Therefore, when the temperature is raised additional kilowatts may be furnished to the molten bath, thereby serving to increase the output of the glass tank.

A plurality of oxy-fuel burners may be utilized in accordance with the present invention to control the movement of the unmelted batches and to increase the melting rate in the glass tank. For example in FIG. 1 a second burner 42a in port 40a could project a second flame toward the hot spot. The products of combustion from the second burner would also serve to force the unmelted batch toward the back wall and increase the temperature of the hot spot. There would be little likelihood of getting whirlpool circulation, however the momentum transfer would be increased and greater heat would be transferred to the area of the hot spot. Thus two or more oxy-fuel burners could be used in the present invention. For the most efficient and preferred operation the burners would be positioned and operated as described above.

Although the oxy-fuel burners in FIGS. 1–3 are illustrated as being in the side walls of the tank, they may also be placed in either the bridge wall or the roof if convenient. Generally it has been found that the side walls are easily accessible and uncluttered, making burner installation relatively easy.

Figure 4:
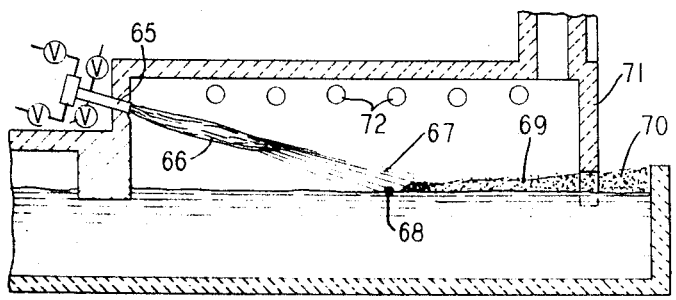
FIG. 4 is a schematic illustration partly in section, partly broken away, showing in elevation another form of glass tank embodying the present invention.

In FIG. 4 there is illustrated in schematic form a glass furnace comparable to that illustrated in FIG. 1 of the parent application. In FIG. 4, however, the oxy-fuel burner 65 is positioned in the bridge wall on the axis of the furnace so that the products of combustion 67 emanating from the oxy-fuel flame 66 directly contact the batch materials 69 in the area of the hot spot 68. The momentum of the hot combustion gases forces the unmelted material toward the entrance end of the melting zone away from the hot spot 68. In addition the gases serve to increase the temperature of the hot spot causing increased thermal circulation toward the infeed end. In the embodiment shown in FIG. 4 the raw material is placed in the feed end 70 and floats under the entrance end wall 71 toward the fining end of the furnace. By utilizing the oxy-fuel burner in the manner illustrated in FIG. 4 the unmelted batch material can be maintained in the area of the infeed end and not allowed to move down toward the bridge wall.

The oxy-fuel burner 65 may be mounted on the longitudinal center line of the glass tank and inclined downwardly so as to project the hot combustion gases on the area of the hot spot, as shown in FIG. 4. The invention also contemplates positioning the burner 65 at an angle to the longitudinal axis in the same manner that burner 42 is at an angle A to the longitudinal axis of the glass tank shown in FIG. 1. The size of the angle depends on the dimensions of the glass tank and where the batch enters the melting zone. The burner should not drive the raw batch materials against the side walls but toward the entrance end wall or back wall. In FIG. 1 the side mounted dog house injects the raw glass batch materials in a transverse direction and by positioning the burner at an angle A, approximately 35°, the batch can be maintained at the infeed end or a recirculation whirlpool may be created. In FIG. 4, on the other hand, the batch materials are injected in a longitudinal direction and therefore a burner mounted along the longitudinal center line and inclined downwardly to oppose the movement of the batch is preferred. An angled burner could however be used. In positioning the burner or burners, care should also be given to locating the oxy-fuel flame as close to the molten bath surface as possible without actually contacting it. The preferred location of the burner tip and the dimensions of the flame are given above in the discussion relating to FIG. 1. A plurality of oxy-fuel burners may be utilized in the embodiment shown in FIG. 4. They may be installed so as to be either substantially parallel with the longitudinal axis of the furnace or at an angle to the axis as described above in connection with FIG. 1. Conventional air fuel burners are indicated by the reference numeral 72 and they may be operated in the normal manner. In addition, the embodiment shown in FIG. 4 may be equipped with electrodes such as that shown in FIG. 3 to assist in the heating of the batch materials.

According to the present invention the oxy-fuel burner must be installed in the glass tank downstream of the hot spot and in a position such that the products of combustion of the oxy-fuel flame will strike the general area of the hot spot or upstream thereof and cause the unmelted material to be swept or maintained upstream of the hot spot. By mounting the burners in this manner the thermal currents which are generated by the hot spot will be assisted and the unmelted material will be kept upstream of the hot spot, thereby resulting in improved glass purity and increased production rates.

Although the present invention is especially suited for accelerating the melting of flint container glass in a reverberatory furnace it may be applied to the production of different types of glass in other types of glass furnaces.

It is to be understood that although the preferred embodiments of the invention are shown and described herein, various changes and modifications may be made without departing from the spirit of the invention as defined in the following claims.

I claim:

1. A process for producing refined glass from raw glass making materials in a glass tank comprising the steps of charging raw glass making materials into the feed end of said tank, heating the contents of the tank so as to melt the raw materials and form a molten bath having a hot spot, supplying at least part of said heat by directing an oxy-fuel flame into the glass tank from a location downstream of the hot spot, impinging the combustion products of said flame on the unmelted glass making materials causing said unmelted materials to remain near the feed end of said tank until melted, withdrawing refined glass from the exit end of said tank.

2. A process according to claim 1 including directing said oxy-fuel flame so that the combustion products of said oxy-fuel flame impinge on the molten bath in the approximate area of the hot spot or upstream thereof.

3. A process according to claim 2 wherein the combustion products impinging on the hot spot have a temperature within the range of from about 3000° F. to about 4000° F.

4. A process according to claim 1 including supplying fuel gas and oxygen to said oxy-fuel flame to produce a non-luminous flame having a temperature between about 4000° F. and 5000° F.

5. A process according to claim 1 wherein the flame envelope of the oxy-fuel flame terminates a distance of no less than about two feet and not more than about ten feet from the surface of the molten bath, said distance being measured along an extension of the longitudinal axis of said flame.

6. A process according to claim 1 including directing said oxy-fuel flame downwardly and in a direction generally counter-current to the normal flow of raw glass making materials through the glass tank.

7. A glass making furnace comprising a melting zone and a fining zone, means to introduce raw glass batch material into said melting zone, means to introduce heat into said furnace including an oxy-fuel burner, means mounting said burner to direct an oxy-fuel flame and the products of combustion therefrom in a direction countercurrent to the normal direction of movement of the raw glass batch from the melting zone to the fining zone, and means to withdraw glass product from said furnace.

8. A furnace according to claim 7 in which said mounting means directs said burner downwardly so that said products of combustion impinge upon the area of the hot spot in the melting zone.

9. A furnace according to claim 7 in which said mounting means positions the tip of said burner no less than about one foot and not more than about four feet from the molten surface in the melting zone and directs the oxy-fuel flame from said burner downwardly in the direction of the molten surface.

10. A furnace according to claim 7 in which said burner is mounted in the side wall of the furnace.

11. A furnace according to claim 7 in which said burner is mounted in the bridge wall of the furnace.

12. A furnace according to claim 7 having two oxy-fuel burners, means mounting said burners so that the products of combustion from both burners impinge on the area of the hot spot.

13. A furnace according to claim 7 including means for supplying oxygen and fuel to the oxy-fuel burner to produce a non-luminous flame having a temperature not less than about 4000° F. and not more than about 5000° F. and a flame envelope length not less than about two feet and not more than about ten feet.

14. A furnace according to claim 13 in which said flame envelope terminates not less than about two feet and not more than about ten feet from the molten bath measured along an extension of the longitudinal axis of the flame.

15. A furnace according to claim 7 in which said means to introduce raw materials deposits part of said materials on the surface of the molten bath in the melting zone, said mounting means directing said products of combustion to impinge on the raw materials on the surface and cause them to move in a direction countercurrent to the normal direction of movement.

16. A method of controlling the movement of raw glass batch material in a glass tank comprising, adding heat to the glass tank to melt and refine the raw glass batch material, the addition of heat creating a hot spot in the molten bath in the tank, directing an oxy-fuel flame toward the hot spot so that the products of combustion from the flame at least partially impinge on the surface of the bath in the area of the hot spot, and controlling the length of the oxy-fuel flame so that the flame envelope does not touch the surface of the bath.

17. A method according to claim 16 including directing a plurality of oxy-fuel flames toward the hot spot.

18. A method according to claim 16 including introducing raw batch material into the glass tank upstream of the hot spot, withdrawing glass product from the glass tank downstream of the hot spot.

19. A method according to claim 18 including directing the oxy-fuel flame from a location downstream of the hot spot and controlling the location of the raw batch materials on the surface of the bath with the products of combustion from the flame.

20. A method according to claim 18 including regulating the oxygen and fuel feed to the flame to produce a non-luminous flame having a temperature within the range of from about 4000° F. to about 5000° F.

21. A method according to claim 16 including supplying said oxy-fuel flame with feed streams of natural gas and commercially pure oxygen.

22. A process for producing refined glass from raw glass making materials in a reverberatory glass tank comprising the steps of, directing an air-fuel flame into the glass tank from above the level of the bath, charging raw glass making materials through a feed opening into the glass tank, directing an oxy-fuel flame at a slight downward angle into the glass tank from a level above the bath but below the level of introduction of the air-fuel flame, and impinging products of combustion from said oxy-fuel flame but not the flame itself on unmelted glass making materials floating on the surface of the bath so that the momentum exchange between said products of combustion and said unmelted materials causes said unmelted material to remain near the feed opening until melted.

23. A process according to claim 22, further including impinging products of combustion from said oxy-fuel flame on the area of the hot spot in the bath.

24. A process according to claim 23 including directing said oxy-fuel flame into the glass tank from a location downstream of the hot spot.

25. A process for melting and refining glass in a glass tank, comprising the steps of introducing raw glass making materials into said tank through a feed opening, withdrawing glass from said tank after it has been melted and suitably refined, directing an air-fuel flame into the glass tank from above the level of the bath in the tank, directing an oxy-fuel flame at a slight downward angle into the glass tank so that products of combustion therefrom, but not the flame itself, contacts unmelted incoming raw glass making materials causing said raw materials to circulate near the feed opening until said raw materials melt and become a part of the molten bath.

26. A process for melting and refining glass in a glass tank comprising adding heat to the glass tank to melt and refine the raw glass batch material, withdrawing refined glass from the refining end of the tank, adding raw glass batch to the infeed end of the tank to maintain a desired bath level in the tank, directing an oxy-fuel flame at a slight downward angle into the tank above the bath level, impinging the products of combustion from said flame on raw glass batch material which lies on the surface of the bath at the infeed end of the tank thereby preventing the movement of the raw batch material toward the refining end of the glass tank.

References Cited
UNITED STATES PATENTS

| 1,941,778 | 1/1934 | Amsler | 65—135 |
| 3,337,324 | 8/1967 | Cable, Jr., et al. | 65—135 |
| Re. 26,364 | 3/1968 | Kurzinski | 75—43 |

ARTHUR D. KELLOGG, Primary Examiner

U.S. Cl. X.R.

65—136, 335, 337, 347

UNITED STATES PATENT OFFICE
CERTIFICATE OF CORRECTION

Patent No. 3,592,623                           Dated July 13, 1971

Inventor(s) THOMAS L. SHEPHERD

It is certified that error appears in the above-identified patent and that said Letters Patent are hereby corrected as shown below:

Column 3, line 69, "23" should read --33--.

Column 4, beginning line 54, after "bath" the following has been added and is not found in the original application nor in any amendment and should be deleted:

--in such a manner that they will screen out the unmelted materials and also cool a portion of the molten bath--.

Column 5, line 23, "construction" should read --constructed--.

Column 11, line 40, "material" should read --materials--.

Signed and sealed this 16th day of May 1972.

(SEAL)
Attest:

EDWARD M. FLETCHER, JR.
Attesting Officer

ROBERT GOTTSCHALK
Commissioner of Patents